United States Patent [19]

Lloyd et al.

[11] 4,131,251

[45] Dec. 26, 1978

[54] AERIAL DELIVERY WEDGE

[75] Inventors: Robert G. Lloyd, Trenton; Anthony C. Street, Winnipeg, both of Canada; Donald M. G. R. Golden, deceased, late of Edmonton, Canada, by Jean J. Golden, executrix

[73] Assignee: Her Majesty the Queen in right of Canada, as represented by the Minister of National Defence, Canada

[21] Appl. No.: 771,986

[22] Filed: Feb. 25, 1977

[30] Foreign Application Priority Data

Mar. 11, 1976 [CA] Canada ................................ 247709

[51] Int. Cl.$^2$ ............................................. B64D 1/08
[52] U.S. Cl. .............................. 244/137 R; 244/118 R
[58] Field of Search .......................... 244/118 R, 137 R;
214/84, 505; 258/1.2, 1.6; 193/35 R; 248/397, 398, 188.2

[56] References Cited

U.S. PATENT DOCUMENTS

| 2,426,862 | 9/1947 | Cunningham | 244/137 R |
| 3,088,608 | 5/1963 | Theodore | 244/137 R X |
| 3,964,625 | 6/1976 | Wirz | 214/505 X |

FOREIGN PATENT DOCUMENTS 1074825  7/1967  United Kingdom ................ 244/137 R

OTHER PUBLICATIONS

"Lockheed C-130", *Jane's All the World's Aircraft,* 1974–1975, pp. 374–375.

*Primary Examiner*—Barry L. Kelmachter
*Attorney, Agent, or Firm*—Lowe, King, Price & Becker

[57] ABSTRACT

A portable and adjustable aircraft cargo handling system designed to facilitate substantially simultaneous aerial delivery of cargo from a cargo ramp and paratroops from side doors from a conventional troop carrying aircraft of the Hercules C130 type which is provided with an inwardly and upwardly-opening rear cargo door and an outwardly and downwardly opening rear cargo ramp. The cargo device includes a base, which can be secured to the conventional aircraft cargo ramp; a load carrying platform, having friction reducing rollers or the like, superimposed on the base and pivotally connected thereto along one of its marginal edges; and a lifting device which is located between the base and the platform to raise and lower one end of the platform relative to the base between a first, lowered position in which cargo is loaded thereon and loaded into the aircraft and a second, raised position in which cargo is carried in flight and is discharged from the aircraft when the rear cargo door is raised. In the raised position, the platform provides a 5° rearward slope to facilitate easy release of the cargo load, without the necessity of lowering the cargo ramp.

14 Claims, 5 Drawing Figures

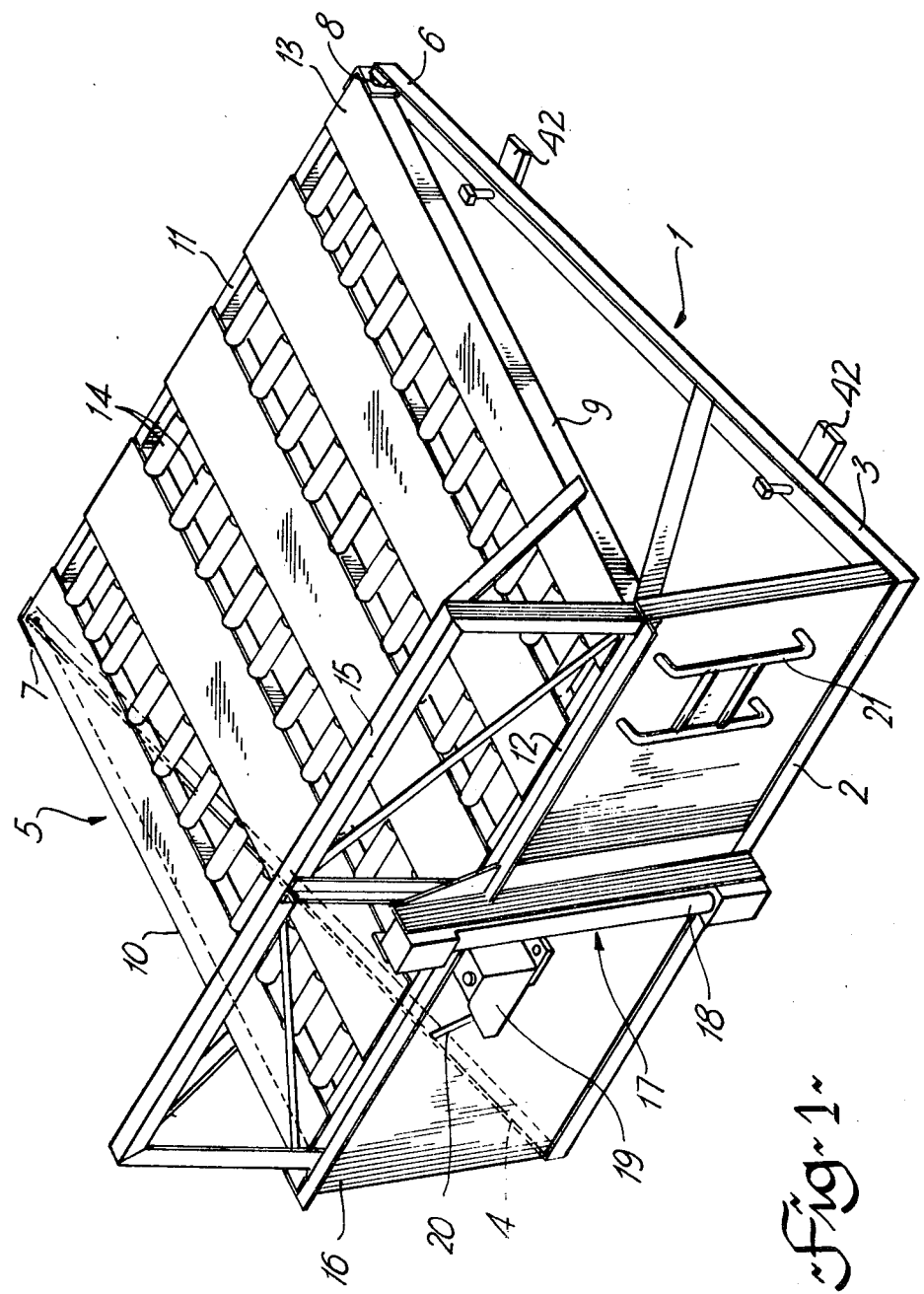

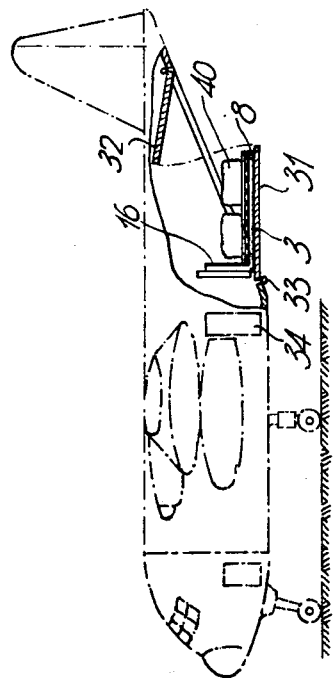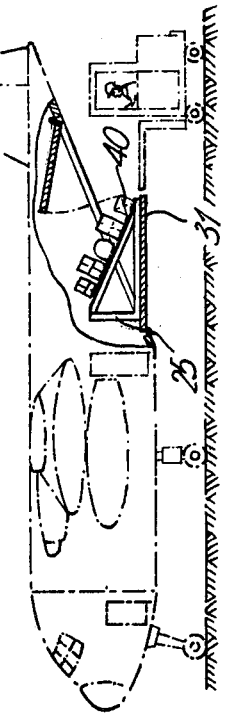
Fig-3
Fig-2 (PRIOR ART)
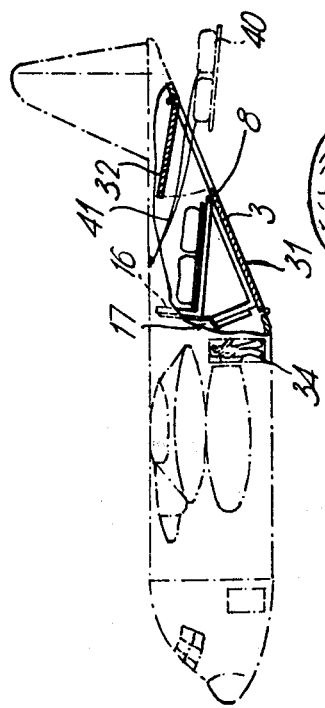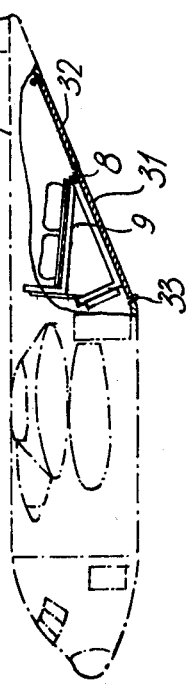
Fig-5
Fig-4

AERIAL DELIVERY WEDGE

This invention relates to a cargo handling device and more particularly an adjustable wedge shaped device to facilitate rapid parachute delivery of cargo and paratroopers from an aircraft in flight.

Aerial delivery of relatively large loads, for both civil and military purposes, is well known and has been practised with considerable success for many years. It is difficult, however, to drop relatively large teams of men and a large number of cargo loads from a single aircraft onto a compact drop zone or other small drop zone such as an aircraft crash site where immediate aid is required, largely because of the difficulty of handling large, heavy palletized cargo loads rapidly from the normally rearwardly facing and horizontally disposed cargo discharge ramp and the problems encountered with the whipping and tangling action of parachute static lines when more than twenty are used for drops from the cargo ramp. It will be appreciated that troop and cargo carrying aircraft, such as the Hercules C130 used by the Canadian Armed Forces, are conventionally provided with an inwardly and upwardly opening rear cargo door and an outwardly and downwardly opening cargo ramp together with doors on each side of the aircraft aft of the wings through which the troopers normally exit. In order to achieve near simultaneous exit it is one practise to have both men and cargo exit from the lowered cargo ramp but when more than twenty static lines are involved the problems enumerated above become important. An alternative method is, of course to exit troops through the side doors and the heavy cargo loads over the lowered cargo ramp. This procedure is, however, extremely hazardous because there is a significant risk that the troopers will strike the lowered cargo ramp as they fall clear of the forwardly moving plane. Further, and perhaps even more important, simultaneous opening of the side doors and the cargo ramp results in considerable air turbulence within the aircraft which may, at times, make it almost impossible for the jump masters to fulful their tasks of dispatching the men and releasing the cargo. In certain cases the turbulence may be so severe, setting up drafts of the order of 65 mph within the plane, that the stability of the aircraft is severely jeopardized, requiring extensive corrective action from the pilot and even causing structural damage to the aircraft. It has been previously suggested that an auxiliary wedge shaped ramp should be mounted on the cargo ramp to provide a sloping surface and thus facilitate aerial dicharge of cargo, but such an auxiliary rampepresents considerable problems, particularly when it is necessary or desirable to maintain the cargo pallet in a substantially horizontal plane during the loading operation into the aircraft.

It is an object of the present invention to overcome the unloading difficulties encountered by use of prior art equipment and to provide a simple cargo handling device which will facilitate easy aerial delivery of relatively heavy palletized cargo loads with the simultaneous dispatch of forty or more paratroopers.

Thus, by one aspect of this invention there is provided a portable and adjustable cargo handling device, for use in an aircraft, comprising:

(a) a planar base dimensioned to be received on an aircraft cargo loading ramp;

(b) means to secure said base to said ramp;

(c) a load carrying platform superimposed on said base and pivotally connected, adjacent one of its marginal edges, to said base; and (d) lifting means between said base and said superimposed platform to effect pivotal movement of one end of said platform relative to said base;

said platform including friction reducing means on the load supporting surface thereof to facilitate sliding movement of a load thereover.

By another aspect of this invention there is provided a method for the substantially simultaneous aerial parachute dispatch of cargo loads and men from an aircraft having at least one side jump door, a rear cargo ramp outwardly pivotable about a point adjacent said door between an angled closed in-flight position and an open, substantially horizontal, cargo-loading position and an associated rear cargo door inwardlly pivotable about a point adjacent the rear of the aircraft between a closed in-flight position and an open position, comprising the steps:

(a) pivoting said cargo door and said cargo ramp to their respective open positions;

(b) securing a cargo load to a load carrying platform on a portable cargo handling device, said platform being angularly adjustable between a collapsed and an extended position relative to the base of said device;

(c) securing the base of said cargo handling device to said cargo ramp with said platform in said collapsed position;

(d) closing said cargo door and said cargo ramp and raising said platform to said extended position relative to the base, thereby maintaining said platform in a substantially horizontal plane within said aircraft;

(e) adjusting the position of said platform so as to provide up to about 10° rearward slope thereto upon approach to a predetermined drop zone;

(f) opening said at least one side jump door and said rear cargo door while maintaining said cargo ramp in said closed position; and (g) exiting men through said at least one side jump door and simultaneously releasing said cargo load from said platform thereby permitting said load to slide out of said aircraft through said rear cargo door opening upon arrival at said predetermined drop zone.

The invention will be described in more detail hereinafter by reference to the accompanying drawings in which:

FIG. 1 is an isometric sketch of one embodiment of the cargo handling device of the present invention, shown in the raised position;

FIG. 2 is a sketch showing a fixed auxiliary wedge of the prior art, in the loading position;

FIG. 3 is a sketch showing a loaded cargo-wedge device of FIG. 1 in the loading position in a Hercules C130 aircraft;

FIG. 4 is a sketch showing the device of FIG. 1 in the normal in-flight position in a Hercules aircraft; and FIG. 5 is a sketch showing the device of FIG. 1 in the cargo-discharge position during straight and level flight in a Hercules aircraft.

Turning firstly to FIG. 1, there is provided a base, indicated generally at 1, which is dimensioned for mounting on the cargo ramp of an aircraft, such as the Hercules C130 as used by the Canadian Armed Forces. The base 1 is fabricated from aluminum 7075-T6 alloy structural angle material and is provided with a rear member 2 and side members 3 and 4 rigidly secured at right angles thereto, for example by riveting or bolting.

The load carrying platform, generally indicated at 5 is pivotally connected to base 1 at the ends 6 and 7 of arms 3 and 4 respectively, by means of any suitable bushed pivots 8. The platform 5 is similarly fabricated in structural aluminum having side members 9 and 10 and ends 11 and 12. The load carrying surface is formed by aluminum (65S-T6) tread plates 13 and is preferably provided with a plurality of conventional friction reducing means such as rollers 14, or castors or the like. Preferably a back stop frame 15 is mounted on end member 12 perpendicular to the load carrying surface 13. Similarly base 1 may also be provided with a back stop frame 16. A jacking device 17 is mounted between base 1 and platform 5 so as to effect raising and lowering of end 12 of the platform 5 relative to the base 1. The jacking device 17 may be any convenient and conventional device such as a self contained screw jack, hydraulic cylinder or the like. In FIG. 1 there is shown a "Tolomatic" ® cylinder 18, operating an endless wire rope device secured to platform 5, which is driven by a self-contained hand-operated hydraulic pump 19, which is actuated by handle 20 in known manner. It is preferred, but not essential, that the lifting device be self-contained and either manually, battery or pressure powered, in order to avoid the problems inherent upon providing suitable power, hydraulic, or high pressure air connections in the aircraft. It will also be appreciated that to equalize stress on the frame and platform two or more lifting devices 18 may be employed spaced along the length of frame 16.

It will be appreciated that positive up and down locks (not shown) are normally provided to facilitate locking the platform 5 in either the up or the down position and thus reduce the load on the lifting device. In addition an access ladder 21 may also be provided on frame 16 to facilitate unloading of the platform as described in detail hereinunder. Base members 3 and 4 are normally provided with or adapted to receive standard locks (not shown) to secure them to the aircraft cargo loading ramp. The device shown in FIG. 1, for a C130 aircraft weighs of the order of 930 lbs and has a load capacity of the order of 3600 lbs.

As previously indicated, a fixed wedge 25 has been suggested by the prior art, which permits deployment of the cargo as shown in FIG. 5, but this is not very satisfactory, because of the difficulty of loading a sloping load into the aircraft as shown in FIG. 2. It has been further suggested to secure wedge 25 to the ramp 31 before a load 40 is placed thereon, then to raise ramp 31 to the position shown in FIG. 5, with upper door 32 in the raised position and to then load the load 40 with an extended forklift or the like. Such a procedure is relatively difficult because of the now restricted access for the mast of the forklift truck and the difficulty of providing proper support for the rear of the aircraft as the load is applied. The centre of gravity of the plane is, of course, critical and until all crew members, jumpers and the like are aboard the weight is not properly distributed so that, in normal loading, with ramp 31 down, a support stool (not shown) is usually placed under the ramp 31 to ensure that the plane does not become overly tail heavy and either come down on the mast of the forklift truck or at worst, tip up.

In operation according to the present invention, therefore, cargo is loaded on a skid board and secured to platform 5 which is in the lowered position adjacent base 1 and remote from the aircraft. The loaded device is then carried by any suitable means, such as a forklift to the aircraft which is positioned as in FIG. 3 with the cargo ramp 31 in the horizontal position and rear cargo door 32 in the raised position. The device is then secured to the cargo ramp 31 with lifting device 17 adjacent the pivotal element 33 of the cargo ramp 31 by conventional locking means 42 and the ramp is then raised into the frame of the aircraft. As shown more clearly in FIG. 4, as the outboard end of the ramp is pivoted about 33 and raised, the lifting device 17 is progressively operated so as to raise the platform 5 to the extended position relative to the base 1, thereby compensating for the angle of the ramp 31 relative to the horizontal and thus maintaining the load on platform 5 in a substantially horizontal plane but with a 5° rearward slope when the aircraft is flying straight and level. It will be appreciated that the platform 5 may be maintained horizontal and the aircraft flown 5° nose-high to achieve the same slope effect. When the aircraft reaches the drop zone, as shown in FIG. 5, the rear door 32 is raised inwardly and the paratroopers exit from the aircraft via the rear doors 34 on each side of the plane as the cargo is discharged from platform 5. It will be noted that ramp 31 is not lowered for cargo discharge, thereby avoiding hazard to the existing paratroopers. Because the rear cargo ramp 31 is not lowered, the air turbulence generated within the aircraft is minimal, wind speeds of the order of 1-3 mph being recorded, and the jump masters have no difficulty in executing their assigned tasks. It has been found that with the aforesaid preferred 5° rearward slope of the surface of the platform 5, the load 40 will fall clear of the aircraft under the force of gravity alone as soon as the cargo restraints (not shown) are released or, in practise, cut by the jump master, so that the entire load, often consisting of eight 5-man survival kit-tobaggan loads weighing a total of approximately 2400 lbs together with 40 men can be dispatched within 30 seconds of receipt of the jump signal.

We claim:

1. A portable and adjustable cargo handling device, for use in an aircraft, comprising:
    (a) a planar base dimensioned to be received on aircraft cargo loading ramp;
    (b) means to secure said base to said ramp;
    (c) a platform superimposed on said base and having an upper load supporting surface;
    (d) means pivotally connecting said platform and said base;
    (e) lifting means connected to said platform for pivoting the platform relative to the base to selectively vary the angle of inclination of the load supporting surface relative to a plane defined by said base so that when said ramp is in a closed position said platform is in a substantially horizontal plane within said aircraft; said platform including friction reducing means on the load supporting surface thereof to facilitate sliding movement of a load thereover.

2. A cargo handling device as claimed in claim 1 wherein said lifting means is secured to said base adjacent one end of said platform and operatively connected to said platform adjacent said one end thereof.

3. A cargo handling device as claimed in claim 1 wherein said lifting means is a self-contained lifting device.

4. A cargo handling device as claimed in claim 3, wherein said lifting device is a lifting jack.

5. A cargo handling device as claimed in claim 1 including frame means rigidly secured to one end of said platform and substantially perpendicular thereto forming a back stop for said platform.

6. A cargo handling device as claimed in claim 5 including frame means rigidly secured to said base substantially perpendicular thereto and along a marginal edge thereof thereby forming a back stop for said base.

7. A cargo handling device as claimed in claim 1 wherein said friction reducing means comprise a plurality of rollers regularly disposed over said load supporting surface.

8. A cargo handling device as claimed in claim 1 wherein said base and said platform are fabricated from structural aluminum angle stock.

9. In a system for the substantially simultaneous aerial parachute dispatch of cargo loads and men from an aircraft having at least one side parachute jump door, an outwardly opening rear cargo ramp pivoted at its end adjacent said jump door and an associated inwardly opening rear cargo door pivoted at its end remote from said jump door; the improvement comprising a portable and adjustable cargo handling device having a planar base dimensioned to be received on said cargo ramp; means to secure said base to said ramp; a platform superimposed on said base and having an upper load supporting surface; means pivotally connecting said platform and said base; lifting means connected to said platform for pivoting the platform relative to said base to selectively vary the angle of inclination of the load supporting surface relative to a plane defined by said base so that when said ramp is in a closed position said platform is in a substantially horizontal plane within said aircraft and friction reducing means on the load supporting surface thereof to facilitate sliding movement thereover.

10. A method for the substantially simultaneous aerial parachute dispatch of cargo loads and men from an aircraft having at least one side jump door, a rear cargo ramp outwardly pivotable about a point adjacent said door between an angled closed in-flight position and an open, substantially horizontal, cargo-loading position and an associated rear cargo door inwardly pivotable about a point adjacent the rear of the aircraft between a closed in-flight position and an open position, comprising the steps:

(a) pivoting said cargo door and said cargo ramp to their respective open positions;

(b) securing a cargo load to a load carrying platform on a portable cargo handling device, said platform being angularly adjustable between a collapsed and an extended position relative to the base of said device;

(c) securing the base of said cargo handling device to said cargo ramp with said platform in said collapsed position;

(d) closing said cargo door and said cargo ramp and raising said platform to said extended position relative to the base, thereby maintaining said platform in a substantially horizontal plane within said aircraft;

(e) adjusting the position of said platform so as to provide up to about 10° rearward slope thereto upon approach so a predetermined drop zone;

(f) opening said at least one side jump door and said rear cargo door while maintaining said cargo ramp in said closed position; and (g) exiting men through said at least one side jump door and simultaneously releasing said cargo load from said platform thereby permitting said load to slide out of said aircraft through said rear cargo door opening upon arrival at said predetermined drop zone.

11. A method as claimed in claim 10 wherein said extended position of said platform relative to said base is selected to provide said rearward slope when said aircraft is flying straight and level.

12. A method as claimed in claim 10 wherein said rearward slope is provided by flying said aircraft in a nose-up attitude.

13. A method as claimed in claim 10, wherein said aircraft is provided with a jump door on each side thereof.

14. A method as claimed in claim 10, wherein said rearward slope is adjusted to about 5° from a horizontal plane.

* * * * *